G. H. WADSWORTH.
MACHINERY OR APPARATUS FOR DIVIDING GELATINOUS GUNPOWDER INTO PARTICLES OR GRAINS.
APPLICATION FILED JAN. 6, 1908.
946,745.
Patented Jan. 18, 1910.
6 SHEETS—SHEET 2.
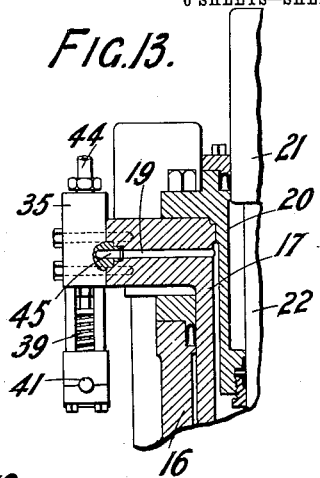
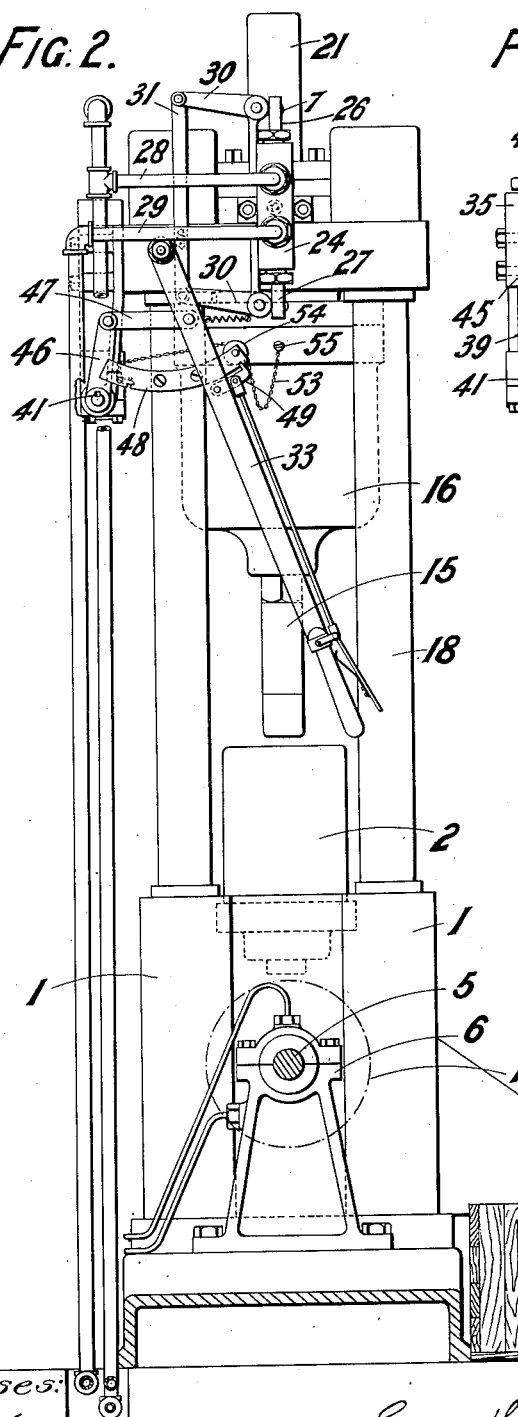
Witnesses:
Inventor:
George Henry Wadsworth
by his attorney G. H. WADSWORTH.
MACHINERY OR APPARATUS FOR DIVIDING GELATINOUS GUNPOWDER INTO PARTICLES OR GRAINS.
APPLICATION FILED JAN. 6, 1908.
946,745.
Patented Jan. 18, 1910.
6 SHEETS—SHEET 3.
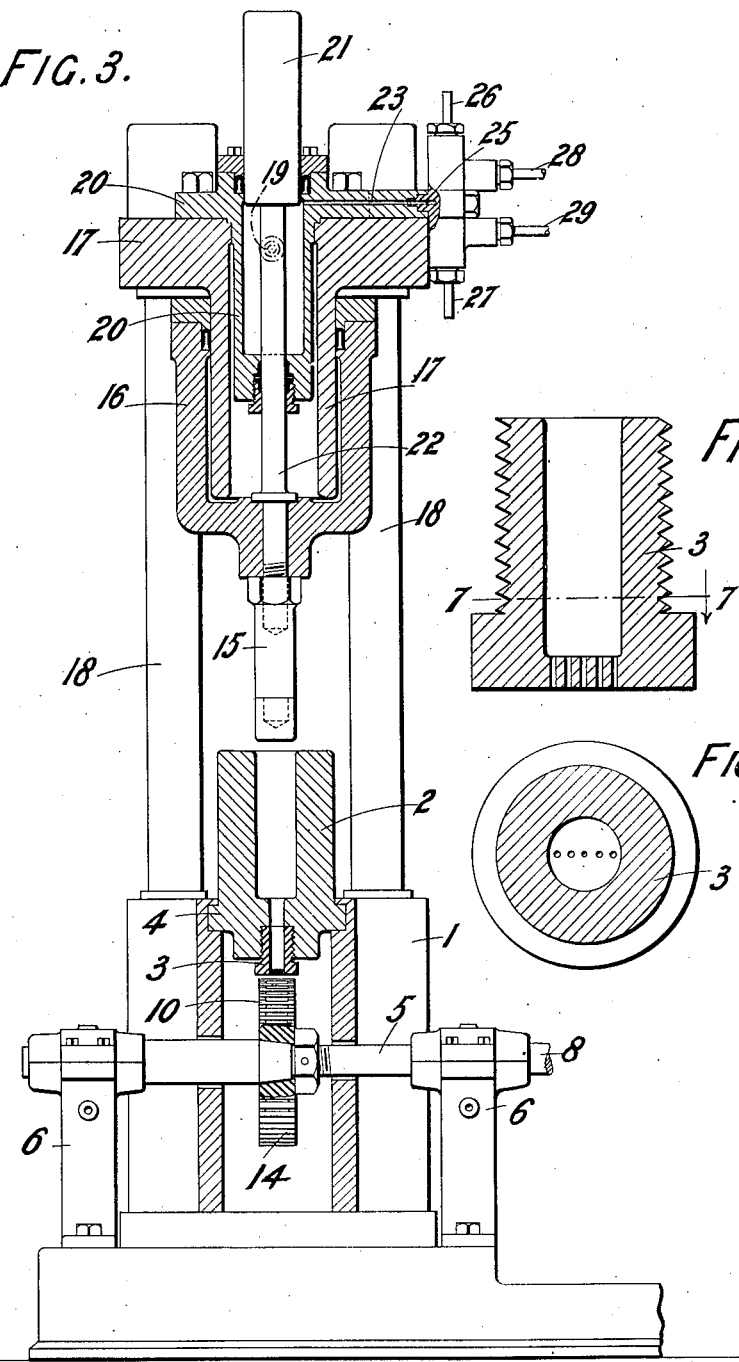
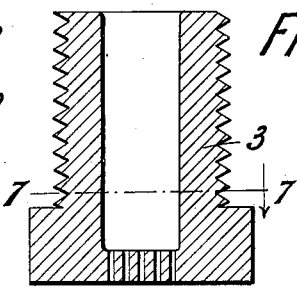
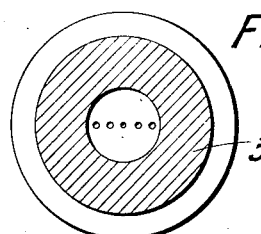

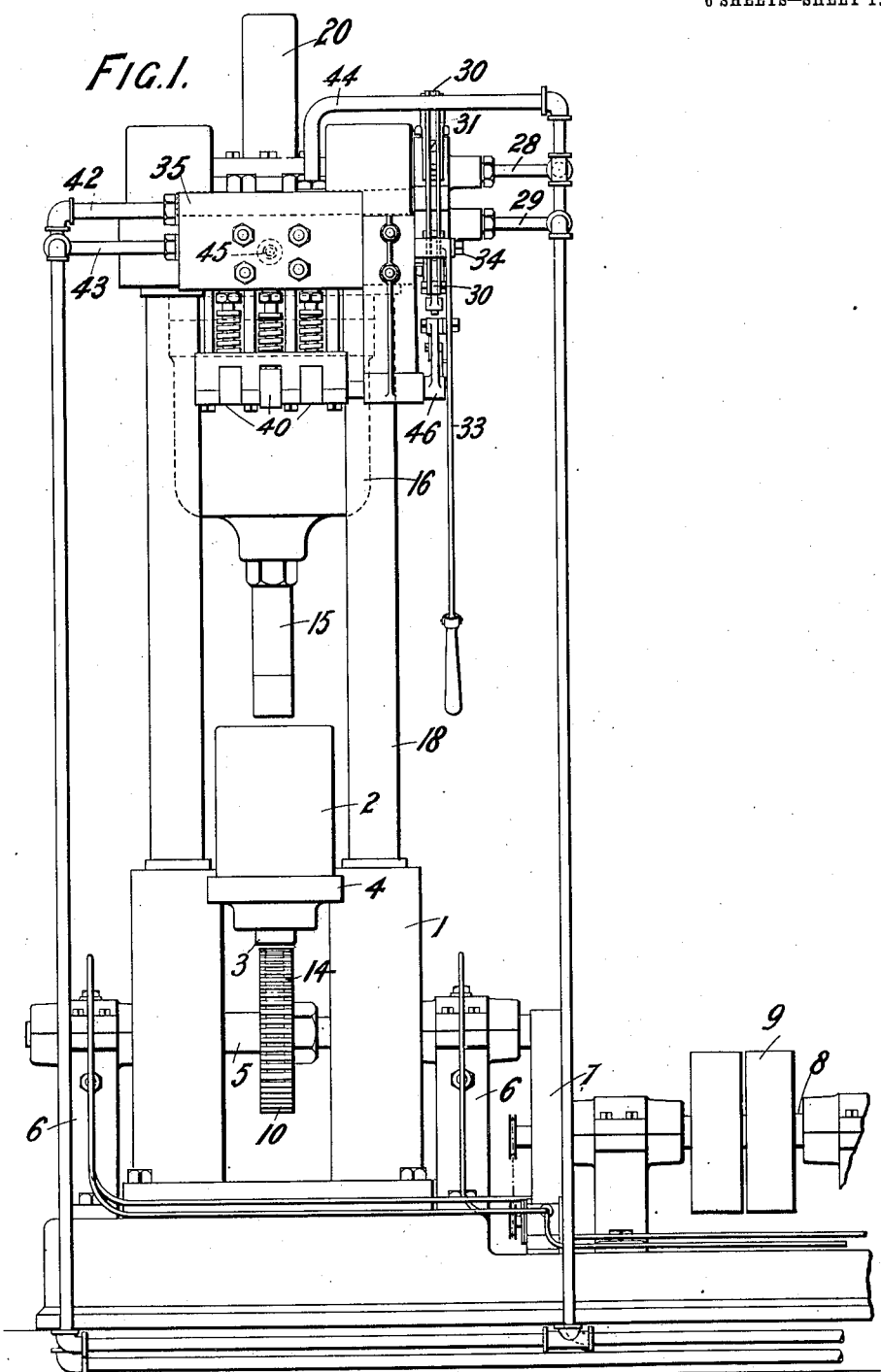

G. H. WADSWORTH.
MACHINERY OR APPARATUS FOR DIVIDING GELATINOUS GUNPOWDER INTO PARTICLES OR GRAINS.
APPLICATION FILED JAN. 6, 1908.
946,745.
Patented Jan. 18, 1910.
6 SHEETS—SHEET 4.
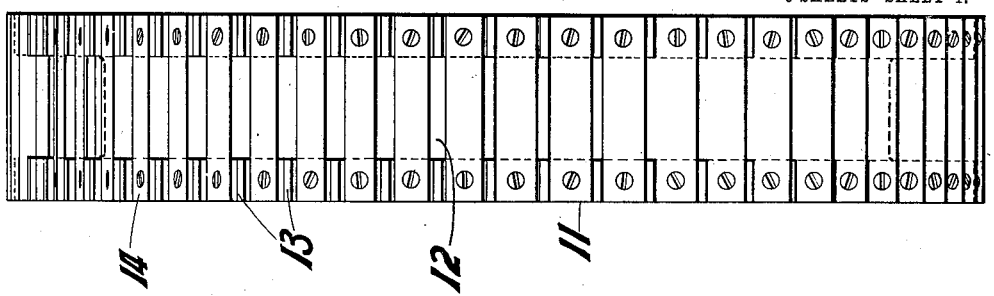
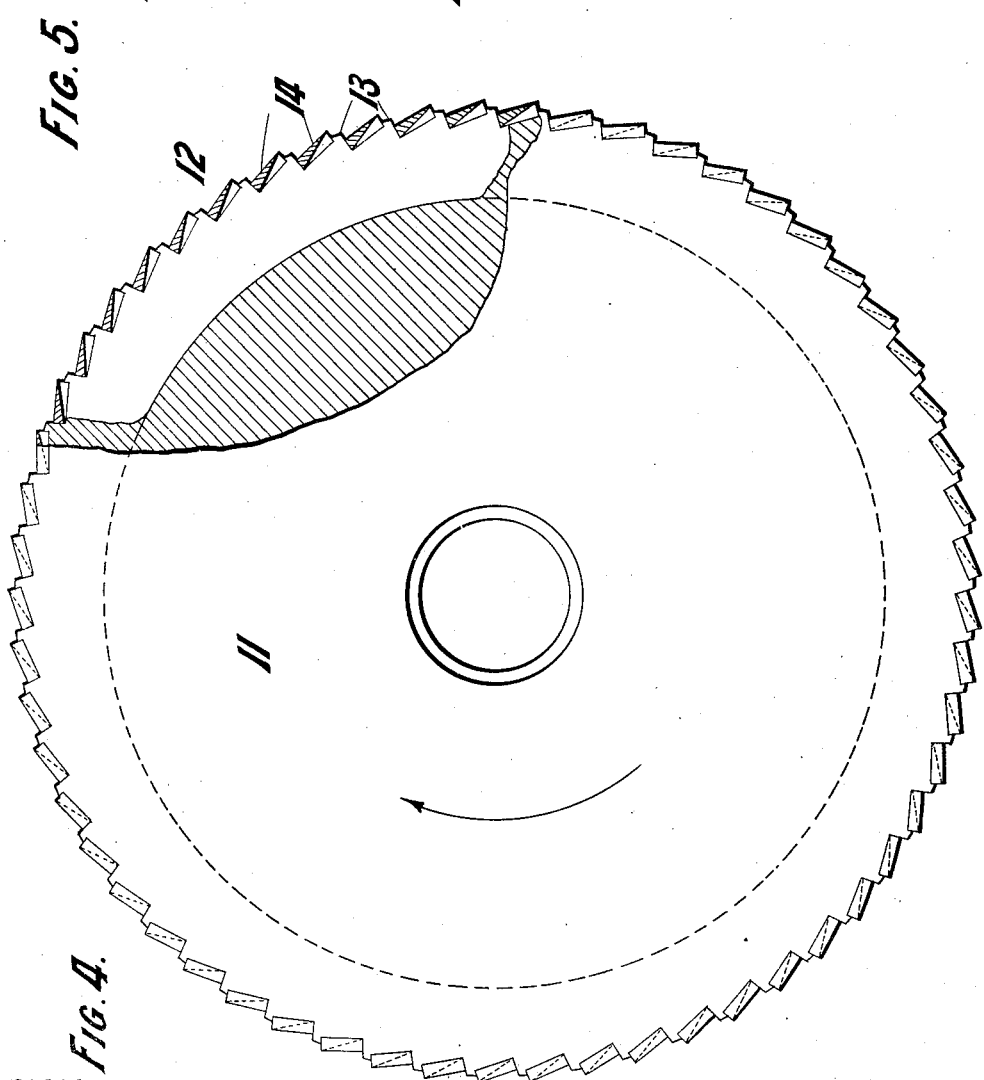

G. H. WADSWORTH.
MACHINERY OR APPARATUS FOR DIVIDING GELATINOUS GUNPOWDER INTO PARTICLES OR GRAINS.
APPLICATION FILED JAN. 6, 1908.
946,745.
Patented Jan. 18, 1910.
6 SHEETS—SHEET 5.
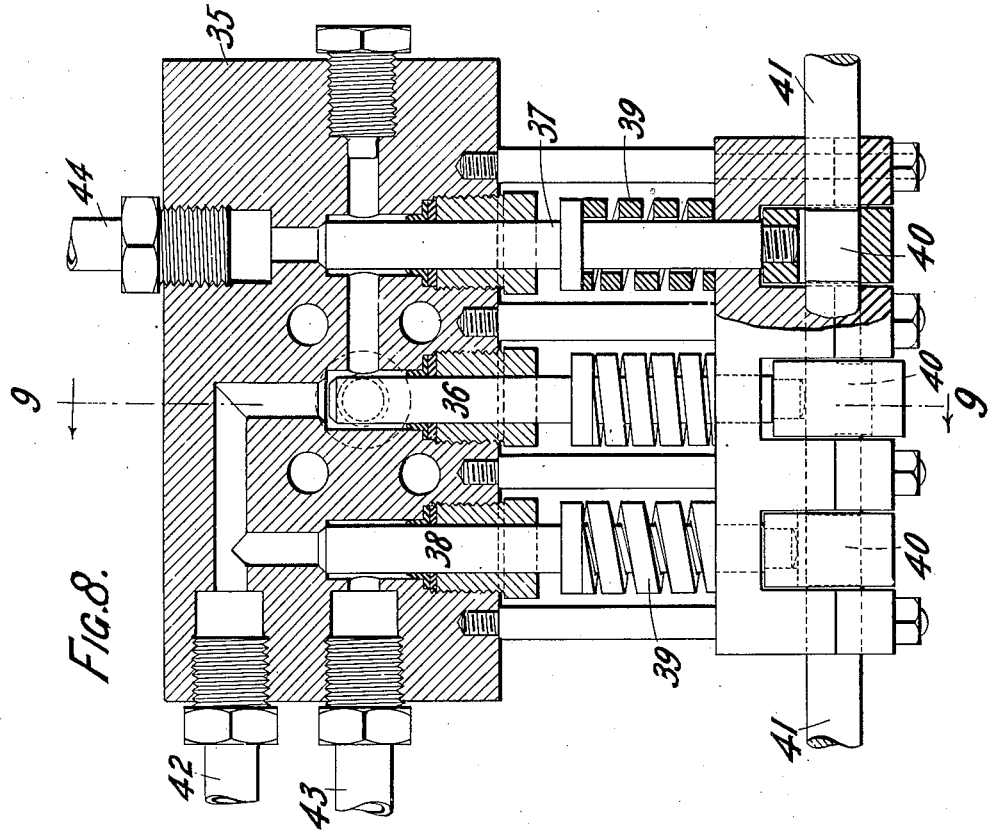
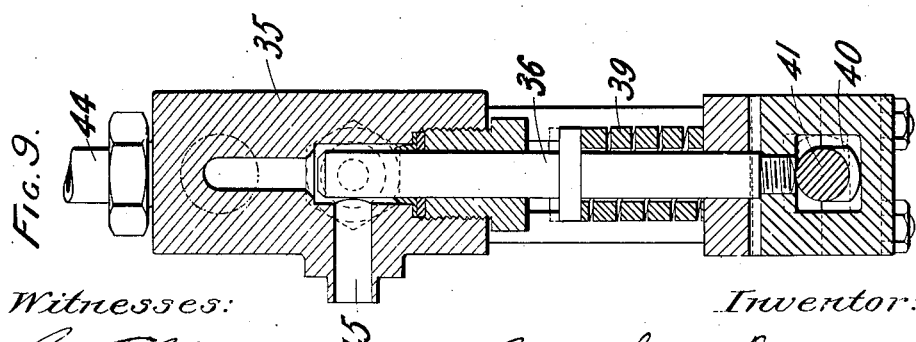
Witnesses:
Inventor:
George Henry Wadsworth
by his attorney G. H. WADSWORTH.
MACHINERY OR APPARATUS FOR DIVIDING GELATINOUS GUNPOWDER INTO PARTICLES OR GRAINS.
APPLICATION FILED JAN. 6, 1908.
946,745.
Patented Jan. 18, 1910.
6 SHEETS—SHEET 6.
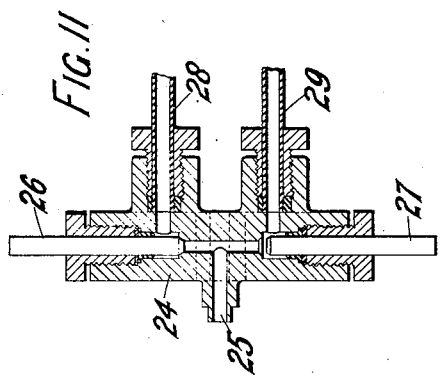
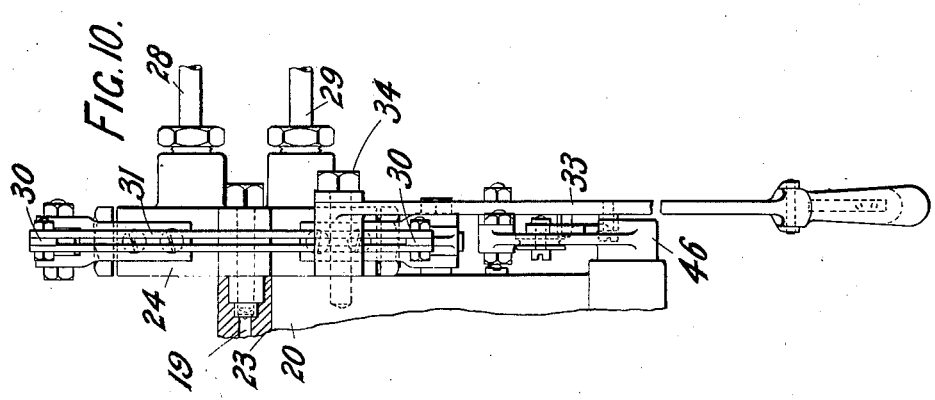
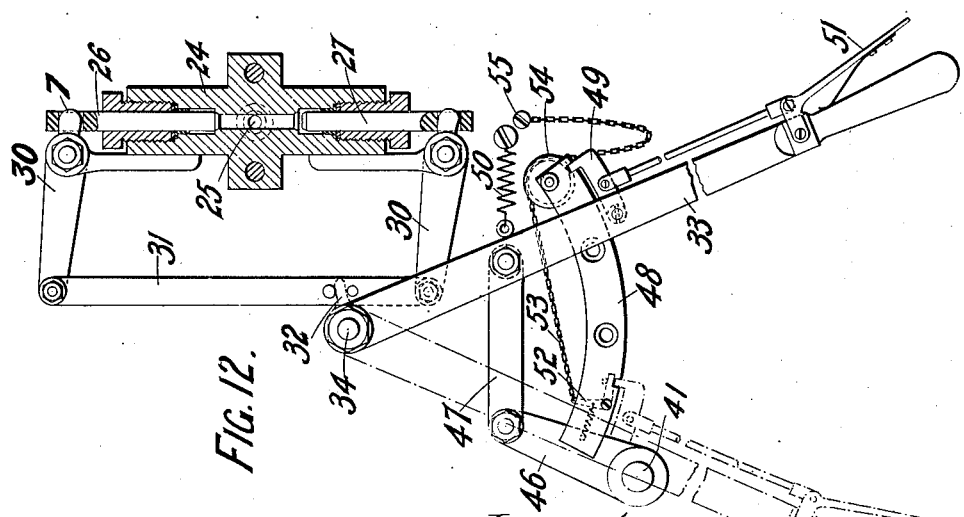
Witnesses:
Inventor:
George Henry Wadsworth
by his attorney

UNITED STATES PATENT OFFICE.

GEORGE HENRY WADSWORTH, OF LYNDHURST, ENGLAND, ASSIGNOR TO THE SCHULTZE GUNPOWDER COMPANY LIMITED, OF LONDON, ENGLAND.

MACHINERY OR APPARATUS FOR DIVIDING GELATINOUS GUNPOWDER INTO PARTICLES OR GRAINS.

946,745.   Specification of Letters Patent.   Patented Jan. 18, 1910.

Application filed January 6, 1908. Serial No. 409,553.

*To all whom it may concern:*

Be it known that I, GEORGE HENRY WADSWORTH, a subject of the King of Great Britain, residing at Lyndhurst, Hampshire, England, have invented certain new and useful Improvements in Machinery or Apparatus for Dividing Gelatinous Gunpowder into Particles or Grains, and of which the following is a specification.

In the manufacture of nitro-cellulose gunpowder, the explosive is dissolved in a solvent so as to become gelatinous, and it is required then that the plastic mass be subdivided into grains of suitable size.

Now in performing the operation of subdivision, it has been proposed to force the gelatinous explosive through a die-plate by mechanical pressure, and in a machine for effecting the process, a knife or knives have been employed, which rotate against and in contact with the face of the die-plate so as to cut off short lengths of the gelatinous explosive as the streams of the same are ejected through numerous perforations in the die-plate. Now such a machine presents some considerable disadvantages in use, and particularly in the fact that the rapidity of its action is limited owing to it being necessary to bring the knives into actual contact with the underside of the die-plate through which the streams of the explosive are forced, so that the short lengths of explosive may be cut off against the resistance and support afforded the gelatinous streams by the ports or perforations of the die-plate.

Now the object of the present invention is to so improve this type of machinery, that the production of each single machine can be enormously increased, while at the same time for greater safety can be assured during the carrying-out of the operation even at such an increased rate of out-put. To effect these ends, according to the present invention I do not increase the number of perforations or ports in a die-plate, but I rather reduce the number heretofore employed, and I dispense with knives contacting or frictionally sliding over the die-plate, and substitute therefor a revolving body rotating at a very high velocity and carrying around its periphery a considerable number of knives, none of which knives are ever in surface or frictional contact with the die-plate. The die perforations are preferably and conveniently arranged in a single straight row, in which row the perforations are at a sufficient distance apart to prevent any possible contact between the several streams of jelly as they issue therefrom. With this arrangement I express the jelly at a high rate of speed through comparatively few orifices in front of the high speed, rotary, multiple knife the latter having its axis of rotation parallel with said row of die perforations, so that the blades, owing to the said high velocity and owing to said arrangement of the die perforations in a single straight row parallel with the axis of the multiple knife, will divide the streams of jelly individually in space, and not act upon the same with a scissors-like effect as heretofore. I further provide mechanically acting means, whereby, after the attendant has started the machine by means of a lever, the pressing plunger will descend and express the jelly through the perforations of the die-plate, and upon the plunger nearly reaching the said die-plate, its motion will be automatically reversed, and it will be returned with accelerated speed to its raised position and will there remain until again restarted by hand.

An example of construction of a pressing machine according to this invention is shown in the accompanying drawings, whereon, Figure 1 is a front elevation, and Fig. 2 is a side elevation of the machine shown at Fig. 1, looking from the right. Fig. 3 is a vertical longitudinal section of the machine shown at Fig. 1. Fig. 4 shows, in sectional elevation, a knife-carrying disk, and Fig. 5 is a front elevation of the same cutting disk looking from the right of Fig. 4 and drawn to a larger scale than the previous figures. Fig. 6 is a vertical section on a larger scale than Fig. 3, showing the die-plate of the receiver for the gelatinous explosive, detached, and Fig. 7 is a horizontal section on the line 7—7 of Fig. 6. Fig. 8 is a longitudinal vertical section of the valve controlling the admittance and exhaust of pressure to the pressure cylinder and is drawn to a larger scale than Fig. 1, but corresponds therewith, and Fig. 9 is a vertical transverse section through line 9—9 of Fig. 8. Fig. 10 is a sectional front elevation showing the starting lever and valve gear drawn to a larger scale than Fig. 1 but corresponding therewith, Fig. 11 being a vertical longitudinal section through the valves of Fig. 10, and Fig. 12 is a transverse section taken through Fig. 10 and corresponding to the similar part shown at Fig. 2. Fig. 13 is a vertical section taken transversely of Fig. 1 looking from the right, and showing the port to the pressure cylinder and the valve port in connection therewith.

Supported in the lower part of framework 1 is a receiver 2 of any suitable shape, adapted to receive a supply of the gelatinous explosive which is to be compressed, and the base of the cup of the receiver is fitted with a die-plate 3 in which there are pierced a series of perforations arranged in one line as is shown at Figs. 6 and 7. The receiver 2 is generally mounted in the framework 1, its flanges 4 fitting in a rabbet, so that it can be shifted and replaced with some facility, and below the receiver there is provided a revoluble shaft 5 carried in bearings 6 from the bed of the framework, the bearings being constructed to permit the shaft having considerable velocity of motion, and such a shaft may be driven by speed gear of any ordinary description and which is inclosed in a case 7 (Fig. 1) and is driven from a first motion shaft 8 by pulleys 9, and the first motion shaft 8 upon its other end, may drive speed gear for giving motion to another machine similar to that which is now being described.

Referring to Fig. 3, immediately below the die-plate of the receiver 2 and upon the shaft 5, there is fixed a knife-carrying wheel 10 (Figs. 1 and 3), which is of such diameter that its periphery does not at any time come into frictional contact with the underface of the die-plate 3. A suitable construction of this knife-carrying wheel is shown at Figs. 4 and 5, from which it will be observed that the structure is composed of a disk 11 formed around its periphery with a circumferential channel 12, the edges of the flanges 13, so produced, being notched or toothed to form seatings for tempered steel bars 14, which are fixed thereto by screws and are ground to knife edges in the space between the said flanges 13 as is shown by the sectioned portion of Fig. 4. It will now be understood that if a supply of gelatinous explosive is placed in the chamber of the receiver 2, and is then forced down by a plunger 15 which fits the said chamber, streams of the jelly will be forced through the perforations (Fig. 7) of the die-plate, and will be divided by the knife blades in space, the knife blades not acting upon the streams of jelly with a scissors-like effect, but cutting them by the impact of the blades cleanly and sharply owing to the inertia of the jelly and the very high velocity of the blades. The knife-carrying wheel is revolved at an extremely high velocity, say from 4,000 to 6,000 revolutions per minute, and the disk carries a considerable number of knives, say 60, while it may be that five or more streams of explosive are passing from the die-plate, and therefore it will be readily understood that the out-put is very large and I have found can be safely effected.

The plunger 15 is carried by a piston-cylinder 16 working over a stationary cylinder 17 which is carried by the pillars 18 of the framework, and through the flange of this cylinder is formed a port 19 (Fig. 13) through which the pressure fluid is admitted and exhausted as required. Through the otherwise open top and into the cylinder 17 there depends a return cylinder 20, which is flanged and fixed to the stationary cylinder 17, and in the return cylinder 20 there is fitted a plunger 21, which is fixed to and carried by a rod 22, the lower end of which is connected to the pressure cylinder 16. Through the flange (Fig. 3) of the return cylinder 20 there is a port 23, through which pressure fluid is admitted or exhausted as required. It should now be understood that, if pressure fluid is admitted to the cylinder 16 and the exhaust is open to the return cylinder 20, the plunger 15 will descend and the streams of gelatinous explosive will be expressed through the perforations of the die-plate. The said perforations are arranged in a straight row, and the circumferential channel 12 of the knife-carrying wheel is equal in width to the said line of perforations, and thus the streams of gelatinous explosive are subjected to the action of the rapidly moving knives and are thereby divided in space, while at the same time the plunger 21 enters the return cylinder 20.

It is highly essential that the descent of the plunger 15 should automatically cease immediately before it contacts with the base of the receiver 2, and it is also desirable that the motion having stopped, the plunger 15 should ascend with an increased velocity so as to avoid waste of time, and therefore I provide in this machine, valve mechanism by which these actions shall take place automatically upon the machine having been once started. In order to effect these objects I provide, at the upper part of the machine, a valve casing 24 (Figs. 10-12) having a passage 25 connected, as shown at Fig. 3, to the port 23 of the return cylinder 20, the valve body containing two valves 26, 27, the first controlling a passage 28 to the exhaust, and the second controlling a passage 29 from the accumulator. These valves 26, 27 are operated and connected by levers 30 and a connecting rod 31, and the latter rod is operated by a finger 32 projecting from the boss of a starting lever 33 pivoted at 34 on the framework, so that when the starting lever is rocked from the full line position to the dotted line position, Fig. 12, the valve 26 will open the passage from the return cylinder 20 to the exhaust by the passage 28, and the valve 27 will close the passage from the accumulator.

To control the admission and exhaust of pressure fluid to and from the pressure cylinder 16, I affix a valve case 35 to the upper part of the framework, and such valve case is shown at Figs. 8 and 9 and is fitted with three plunger valves 36, 37 and 38 pressed to their seats by springs 39, and operated by cams 40 on a rock-shaft 41 carried in bearings from the valve case 35.

The valve case 35 is formed with passages from which a tubular connection 42 extends to the pressure pumps, a pipe 43 extends to a pressure accumulator of any ordinary construction, and a pipe 44 passes to the exhaust, while a passage 45 in the valve casing communicates with the port 19 to the pressure cylinder 17.

The cams 40 are so set that when in the position shown at Fig. 8, the passage from the pump connection 42 is open to the passage 45, and so to the pressure cylinder, while the exhaust by the pipe 44 is closed, as is also the passage communicating with the accumulator pipe 43, and in this position the valve 26 (Fig. 11) should be open and the valve 27 in that figure closed.

When the shaft 41 is rocked into its second position, the valves 37, 38 (Fig. 8) will be open and the valve 36 closed, and then it will be observed the pressure cylinder will be open to the exhaust by the valve 37, while the communication 42 from the pumps will be open by the valve 38 to the accumulator, and this position of the valves 36—38 will correspond to the position of the valves 26, 27 shown at Fig. 11, and the plunger will be withdrawn by pressure admitted to cylinder 20 from the accumulator, while the pumps will be forcing pressure fluid by the pipe 42, and out of the pipe 43 of the valve casing 35, to the accumulator.

To rock the valve cam shaft 41 a crank 46 is provided, see Figs. 2 and 12, connected by a link 47 to the starting lever 33, and so placed that when the valves 26, 27 are in the position shown at Fig. 12, and the machine is not in operation, the valve 36 (Fig. 8) will be closed and the valves 37, 38 will be open. The starting lever 33 operates adjacent to a segment 48 and is fitted with an ordinary spring bolt 49 capable of engaging either of two notches in the segment 48, and the starting lever 33 is normally held over, so that its bolt 49 comes into engagement with one notch in the full line position, Fig. 12, by means of a spring 50.

To start the machine, the bolt 49 is withdrawn by the handle lever 51, and the lever 33 moved over to the dotted line position, Fig. 12, where the bolt 49 engages the other notch in the segment 48, and then the valves before described are in the position to bring the machine into action to compress the jelly. Upon the segment 48 is pivoted a lever 52 (Fig. 12), to one arm of which is connected a chain 53 passing over a pulley 54, and fixed at 55 to a moving part of the machine, such as the cylinder 16, so that just before the plunger 15 reaches the bottom of the chamber in the receiver 2, the chain 53 will rock the lever 52 and throw out the bolt 49 of the starting lever, and the latter will immediately be drawn over by the spring 50 to the full line position, Fig. 12, and thereby the position of the valves will be changed, and the plunger 50 will be drawn up and remain in the position Fig. 3, until the starting lever 33 is again rocked over by hand.

What I claim as my invention and desire to secure by patent is:—

1. In a machine for dividing gelatinous explosives into grains, the combination with a framework, a receptacle carried thereby to receive the jelly and a die at the base of said receptacle having perforations through which the jelly is to be expressed, of a stationary pressure cylinder carried by the framework and having a port for the admission and exhaust of pressure fluid, means for controlling said port, a piston cylinder slidable over said stationary cylinder, a jelly expressing plunger carried by said piston cylinder and movable vertically within said receptacle, a stationary return cylinder entering and closing the upper end of said stationary pressure cylinder and having a port for the admission and exhaust of pressure fluid, means for controlling this port, an axial rod extending from said piston cylinder and passing through the lower end of said return cylinder, and a plunger on said rod movable vertically within said return cylinder.

2. In a machine for dividing gelatinous explosives into grains, the combination with a framework, a receptacle carried thereby to receive the jelly, a die at the base of said receptacle having a row of vertical perforations through which the jelly is to be expressed, and a knife-carrying wheel beneath said die having its axis parallel with said row of perforations for cutting the streams of jelly in space, of a stationary pressure cylinder carried by the framework and having a port for the admission and exhaust of pressure fluid, means for controlling said port, a piston cylinder slidable over said stationary cylinder, a jelly-expressing plunger carried by said piston cylinder and movable vertically within said receptacle, a stationary return cylinder entering and closing the upper end of said stationary pressure cylinder and having a port for the admission and exhaust of pressure fluid, means for controlling this port, an axial rod extending from said piston cylinder and passing through the lower end of said return cylinder, and a plunger on said rod movable vertically within said return cylinder.

3. In a machine for dividing gelatinous explosives into grains, the combination with a framework, a receptacle carried thereby to receive the jelly and a die at the base of said receptacle having perforations through which the jelly is to be expressed, of a stationary pressure cylinder carried by the framework and having a port for the admission and exhaust of pressure fluid, a piston cylinder slidable over said stationary cylinder, a jelly-expressing plunger carried by said piston cylinder and movable within said receptacle, a stationary return cylinder entering and closing the upper end of said stationary pressure cylinder, an axial rod extending from said piston cylinder and passing through the lower end of said return cylinder, and a plunger on the rod entering said return cylinder, the return cylinder having a port for the admission and exhaust of pressure fluid, valves for admitting pressure fluid to or permitting such fluid to exhaust from the return cylinder and valves for admitting pressure fluid to and exhausting such fluid from the stationary pressure cylinder, a starting lever, mechanism connecting said starting lever with said valves so that in one position of said lever the port of the return cylinder is open to pressure and the port of the pressure cylinder is open to the exhaust while in another position the port of the pressure cylinder is open to pressure and the port of the return cylinder to exhaust, means for normally retaining the starting lever in the first named position, and means connected to a moving part of the machine for shifting said starting lever when the plunger approaches the end of its downward motion, to cause a mechanical reversal of the valves for returning said plunger.

4. In a machine for dividing gelatinous explosives into grains, the combination with a framework, a receptacle carried thereby to receive the jelly, and a die at the base of said receptacle having perforations through which the jelly is to be expressed; of a stationary pressure cylinder carried by the framework and having a port for the admission and exhaust of pressure fluid, a piston cylinder slidable over said stationary cylinder, a jelly expressing plunger carried by said piston cylinder and movable within said receptacle, a stationary return cylinder entering and closing the upper end of said stationary pressure cylinder, a rod extending from said piston cylinder and passing through the lower end of said return cylinder, and a plunger on the rod entering said return cylinder, the return cylinder having a port for the admission and exhaust of pressure fluid, valves for admitting pressure fluid to or permitting such fluid to exhaust from the return cylinder and valves for admitting pressure fluid to and exhausting such fluid from the stationary pressure cylinder, a starting lever, a pivot connecting said lever to said framework, a segment having two notches, a spring bolt on said starting lever to engage one or other of said notches, mechanism connecting said starting lever with said valves so that in the first position of said lever the port of the return cylinder is open to pressure and the port of the pressure cylinder is open to the exhaust, while in the second position the port of the pressure cylinder is open to pressure and the port of the return cylinder to exhaust, a spring to normally retain the starting lever in the first position, a trigger lever pivoted to the segment adjacent to the notch with which the starting lever bolt engages in its second position, a flexible connection from said trigger lever, and means for attaching the other end of said connection to a moving part of the machine to actuate said trigger lever when the plunger approaches the end of its downward motion to cause a mechanical reversal of the valves for returning said plunger, substantially as set forth.

In witness whereof I have hereunto set my hand in the presence of two witnesses.

GEORGE HENRY WADSWORTH.

Witnesses:
HARVEY J. BAVERSTOCK,
CHARLES PACK.